W. N. SPRAGUE.
Shanks for Boots and Shoes.
No. 148,334.                  Patented March 10, 1874.
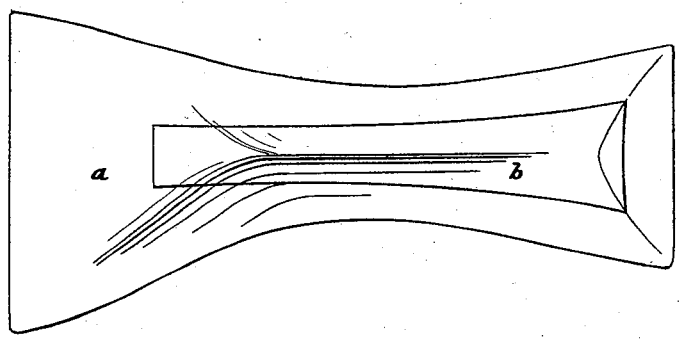
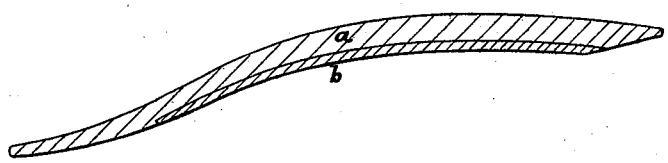

UNITED STATES PATENT OFFICE.

WATSON N. SPRAGUE, OF KEENE, NEW HAMPSHIRE, ASSIGNOR TO HIMSELF AND GEO. GOODYEAR, OF ELIZABETH, NEW JERSEY.

IMPROVEMENT IN SHANKS FOR BOOTS AND SHOES.

Specification forming part of Letters Patent No. 148,334, dated March 10, 1874; application filed February 21, 1874.

*To all whom it may concern:*

Be it known that I, WATSON N. SPRAGUE, of Keene, New Hampshire, have invented certain new and useful Improvements in Shank-Stiffeners for Boots and Shoes, of which the following is a specification:

This invention, in common with other inventions relating to the same subject-matter heretofore made and patented by me, has for its object the production of a cheap, durable, and efficient shank-stiffener designed as a substitute for the ordinary leather shank-piece. In my present improvement I form the body or main part of the shank of leather-board, and I combine with that material one or more layers of leather, which, preferably, occupy that portion of the shank where there is least stock required, so that small pieces of leather scrap can be made available.

By my mode of manufacture, I produce a shank-piece in which the leather-board and leather are intimately and closely united, and the leather is compressed and molded so as to stiffen and hold in shape the leather-board, which constitutes the main part of the shank.

In the accompanying drawing, Figure 1 is a plan of the under side of my improved shank. Fig. 2 is a longitudinal central section of the shank.

In this instance the shank is composed of two layers—the upper one, *a*, of the leather-board or straw-board, the under one, *b*, of leather. It may, of course, be made of more than two layers, and in this case I usually make the upper two layers of leather-board.

I conduct the manufacture of the shank as follows: The several layers of leather-board and leather are cut out by suitable dies. They are laid flat on one another in layers of gradually-diminishing size, and are pasted together. They are then put aside until the paste has set or partially dried, and then are put into a mold, which has the configuration and longitudinal arch or curvature to be imparted to the completed shank, and in that mold the layers are compressed into the form desired. The press rounds the angular corners and edges of the different layers, and gives the curve necessary to cause the shank to fit the boot or shoe. The paste, to some extent, penetrates the material of which the shank is composed, and by thus allowing it, when thus combined with the material, to set or partially dry, so as to thicken before the molding, the leather and leather-board, when molded, will be stiffened, and caused to retain the shape given them in the mold without warping or springing back. The shank thus pressed in a partially-dried condition is laid aside to dry, and when entirely dry it is pressed in the same mold to give it a better finish, and to further indurate and harden it.

The leather, which is cheap scrap-leather, when thus treated and molded, imparts great strength to the shank, and makes it, in connection with the leather-board or straw-board, a good substantial shank-piece, which leather-board alone will not do, inasmuch as by itself it is too tender and breaks too easily to be of much real value; but by the addition of a piece of leather on the bottom, as herein represented, or, if desired, on top, or on both top and bottom of the leather-board, and then pressing and molding the shank after it is partially dried, and repeating the molding pressure after the completion of the drying, a very perfect and finished shank is obtained, possessing all the advantages of a leather shank, while costing but a fraction of what such leather shank would cost.

If desired, a metallic spring can be inserted in or applied to the shank during the process of its manufacture, although this is a refinement which, in practice, will hardly be necessary.

Having now described what I consider to be the best mode of carrying into effect my invention, what I claim, and desire to secure by Letters Patent, is—

As a new article of manufacture, a shank-stiffener for boots and shoes, composed of layers of leather-board or straw-board and leather, put together and molded into shank form under pressure, as herein shown and described.

In testimony whereof I have signed my name to this specification before two subscribing witnesses.

WATSON N. SPRAGUE. [L. S.]

Witnesses:
  JOSEPH M. WELCH,
  JAMES A. TROY.